United States Patent
Chandramouli et al.

(10) Patent No.: US 12,475,628 B2
(45) Date of Patent: Nov. 18, 2025

(54) METHODS, USER EQUIPMENT AND APPARATUS FOR CONTROLLING VR IMAGE IN A COMMUNICATION NETWORK

(71) Applicant: Nokia Technologies Oy, Espoo (FI)

(72) Inventors: Devaki Chandramouli, Plano, TX (US); Kalle Petteri Kela, Kaarina (FI); Benoist Pierre Sebire, Tokyo (JP)

(73) Assignee: Nokia Technologies Oy, Espoo (FI)

( * ) Notice: Subject to any disclaimer, the term of this patent is extended or adjusted under 35 U.S.C. 154(b) by 255 days.

(21) Appl. No.: 18/255,934

(22) PCT Filed: Dec. 3, 2020

(86) PCT No.: PCT/EP2020/084398
§ 371 (c)(1),
(2) Date: Jun. 5, 2023

(87) PCT Pub. No.: WO2022/117185
PCT Pub. Date: Jun. 9, 2022

(65) Prior Publication Data
US 2024/0037833 A1    Feb. 1, 2024

(51) Int. Cl.
*G06T 15/00* (2011.01)
*G06T 7/00* (2017.01)
*H04L 65/80* (2022.01)
*H04N 13/117* (2018.01)

(52) U.S. Cl.
CPC ............ *G06T 15/00* (2013.01); *G06T 7/0002* (2013.01); *H04L 65/80* (2013.01); *H04N 13/117* (2018.05); *G06T 2207/30168* (2013.01)

(58) Field of Classification Search
CPC ............... G06T 15/00; G06T 7/0002; G06T 2207/30168; H04L 65/80; H04L 65/612; H04N 13/117; H04N 21/21805; H04N 21/234345; H04N 21/44218; H04N 21/6587; H04N 21/8456; H04N 21/4728; H04W 28/0268
See application file for complete search history.

(56) References Cited

U.S. PATENT DOCUMENTS

| | | | |
|---|---|---|---|
| 10,785,674 B2 * | 9/2020 | Cakulev | H04W 76/12 |
| 11,044,643 B2 * | 6/2021 | Centonza | H04W 36/0058 |
| 2020/0210764 A1 * | 7/2020 | Hamedi | G06V 10/776 |
| 2021/0067758 A1 * | 3/2021 | Choi | H04N 13/243 |

OTHER PUBLICATIONS

Chen, Mingzhe, Walid Saad, and Changchuan Yin. "Virtual reality over wireless networks: Quality-of-service model and learning-based resource management." IEEE Transactions on Communications 66.11 (2018): 5621-5635. (Year: 2018).*

Tsioliaridou, Ageliki, et al. "Packet routing in 3D nanonetworks: A lightweight, linear-path scheme." Nano communication networks 12 (2017): 63-71. (Year: 2017).*

* cited by examiner

*Primary Examiner* — William A Beutel
*Assistant Examiner* — Chris Alejandro Puntier
(74) *Attorney, Agent, or Firm* — Barta Jones, PLLC

(57) ABSTRACT

Methods, user equipment and apparatus for controlling VR image in a communication network. The VR image is represented by image data being associated to respective parts of the image. The VR image data is handled on the basis of identifications indicating different viewports for a user.

18 Claims, 5 Drawing Sheets

METHODS, USER EQUIPMENT AND APPARATUS FOR CONTROLLING VR IMAGE IN A COMMUNICATION NETWORK

RELATED APPLICATION

This application was originally filed as PCT Application No. PCT/EP2020/084398, filed on Dec. 3, 2020, of which is incorporated herein by reference in its entirety.

FIELD

The subject matter described herein generally relates to communication systems and more particularly, to communication systems supporting virtual reality (VR) and/or augmented reality (AR).

BACKGROUND

Services providing VR, AR and XR (in the following collectively referred to as VR) in communication networks, especially in wireless communication networks, are of increasing interest and pose technically challenges not addressed before.

SUMMARY

Please note that observations with respect to an aspect of the present disclosure, unless otherwise noted, correspondingly apply to any other aspect of the present disclosure even if not presented in connection therewith and, therefore, are not repeated.

According to an aspect, the present disclosure provides a method of controlling VR image in a communication network to be provided to a user equipment, wherein the VR image is represented by image data, the image data comprising at least two image part data each thereof being associated to a respective part of the image, the method comprising determining at least two viewports for a user, each of the at least two user viewports corresponding to a portion of the image to be provided to the user equipment, associating a viewport identification to each of the at least two user viewports, determining, for each of the at least two user viewports, an image part data including image data of the image portion to be provided to or received from the user equipment, associating the viewport identifications respectively to the image part data being determined for the user viewport assigned to the respective viewport identification.

The method may comprise creating a packet detection rule based the viewport identification for detecting traffic of a portion of the image associated with the viewport identification.

The above steps may be carried out by an Application server AS. The AS may provide (e.g. traffic streams) on the basis of which the VR image may by displayed.

The AS may be capable of differentiating VR image data traffic streams for, e.g., a center part of a current FoV for a user and parts at the edges of the FoV. On this basis of such a differentiation, the AS may determine respective viewports and associate viewport identifications thereto.

The AS may provide source-destination information indicating from source the traffic streams are provided and to which destination (e.g. user) the traffic streams are intended. For example, to this end 5-tuples may be used.

The AS may also the provide viewport identifications together with the respective source-destination information The source-destination information and the viewport identifications may be considered as rules for traffic detection.

A Policy and Charging Control PCC of the network (e.g. 5GS PCC) may forward the traffic detection rules, e.g., to a Session Management function SMF the network (e.g. 5GS SMF).

The method may further comprise
providing, from the network to the user equipment, image part data to the user according to the corresponding associated viewport identification.

The method may further comprise
providing, from the network to the user equipment, image part data to the user by
creating a separate data flow for image part data, wherein
the data flows respectively support a quality of service corresponding to the viewport identification assigned to the respective image part data.

For example, a Session Management Function SMF, preferably a 5GS SMF, may create, on the basis of the viewport identifications, different QoS flows for the respective image part data (e.g. traffic streams).

The method may further comprise
providing, from the network to the user equipment, image part data to the user by
creating a common data flow supporting common quality of service, wherein
the common quality of service supports an image quality at least corresponding with a best image quality of one of the viewport identifications,
image part data is provided in association with the respective assigned viewport identification.

The creating step may be carried out by the above entity that may use traffic detection rules from an AS. Such an entity may be a Session Management Function SMF, preferably a 5GS SMF, which, on the basis of the viewport identifications, may create one QoS flow for the image part data.

Then, the viewport identification may be provided as information for a downstream entity taking care of the further handling of the image part data (e.g. traffic streams). For example, such a downstream entity may be a User Plane Function that receives the viewport identifications as part of Packet Detection Rules PDR provided from the SMF.

For further downstream handling of the image part data (e.g. traffic streams), the viewport identifications may be included into header information for use at a downstream entity. For example, the UPF may include the viewport identifications respectively into GTP-U (GPRS Tunneling Protocol—User Plane) header.

The method may further comprise
providing, from the network to the user equipment, image part data to the user by
defining at least two data flows each having a quality of service,
mapping image part data to one of the at least two data flows based on viewpoint identification.

The method may further comprise
providing, from the network to the user equipment, image part data to the user by
defining a common data flows for the image data with multiple 5G QoS Identifier associated to the respective viewport identification, mapping image part data to different data radio bearers DRBs based on 5G QoS identifier and the viewpoint identification.

The defining step may be carried out by a Session Management Function SMF, preferably a 5GS SMF, on the basis of the viewport identifications.

A method according to the preceding claim, comprising mapping each data flow to one or more data radio bearer DRB supporting the quality of service of the respective data flow and/or the viewport identification.

The method may further comprise marking a packet of each data flow with a viewport identification in a GPRS Tunneling Protocol GTP header based on the packet detecting rule.

The method may further comprise including the viewport identification in a Medium Access Control MAC control element.

The method may further comprise including the viewport identification in an enhanced buffer status report eBSR or packet data convergence protocol PDCP control packet unit by the user equipment.

The mapping step may be carried out by a gNB, preferably a 5GS gNB, on the basis of the viewport identifications.

The mapping may be based on viewport identification provided in header information for use at a downstream entity, in GTP-U header(s).

The gNB may use the ability of 5GS to have more than one 5QI within the same QoS flow. For example, a 5QI indicating a QoS level may be(also) as indicator for a quality level of image part data (e.g. traffic streams). To this, e.g., different 5QIs may be respectively assigned to different viewports. Then, the gNB may use a 5QI as information to which DRB the image part data (e.g. traffic streams) for a viewport should be mapped to.

The image part data (e.g. traffic streams) may be differentiated by the UPF on the basis of viewport identification.

To this, e.g., the SMF may install rules for data detection by the UPF on the basis of viewport identification. Such rules allow the UPF to determine image part data (e.g. traffic streams) for each viewport. Such packet detection rules (i.e. rules including viewport identification) allow the UPF to differentiate image part data (e.g. traffic streams) with respect to viewports.

Further, e.g., the SMF may install rules for the UPF to differentiate, on the basis of viewport identification, image qualities of different viewports. For example, the UPF may use such rules to determine that a first viewport identified by a first viewport identification requires a first image quality, that a second viewport identified by a second viewport identification requires a second image quality, etc.

Also, the SMF may assign different QoS flows to the image part data (or traffic streams) on the basis of the viewport identifications. For example, a QoS flow supporting high(er) image quality may be assigned to image part data (e.g. traffic streams) for a central portion of a FoV, while a QoS flow supporting low(er) image quality may be assigned to image part data for a peripheral portion of the FoV.

The UPF may map, based on the viewport identification, the image part data (e.g. traffic streams) accordingly to the respective QoS flow assigned by the SMF.

The method may further comprise
providing, from the network to the user equipment, image part data to the user by
associating an image quality indicator to image part data,
transmitting image part data together with the respective image quality indicator via a common data flow supporting a common quality of service.

Here it may be assumed that a single, common QoS flow is used to convey the image part data. Further, it is assumed that at least two different quality indicators, e.g. 5QIs, are assigned to the common QoS flow in order to differentiate at least two different viewports and respective image qualities. On the basis of the quality indicators (e.g. 5QIs), the network may use the appropriate quality indicators (e.g. 5QIs) for the different image part data (e.g. traffic streams).

For example, the 5GS core network may assign two or more 5QIs for the same QoS flow. Also, there may be an assigning of 5QIs to different viewports and their identification, respectively. For example, a 5QI supporting high(er) image quality may be assigned to image part data (e.g. traffic stream) for a central portion of a FoV, while a 5QI supporting low(er) image quality may be assigned to image part data (e.g. traffic stream) for a peripheral portion of the FoV.

Then, the gNB may use, from the assigned 5QIs, an appropriate one for one viewport, while another appropriate one is used for another viewport.

Particularly, the gNB may be used 5QIs as indicators to map image part data (e.g. traffic streams) to different DRBs within the same QoS flow.

Further, within the same QoS flow, image part data (e.g. traffic streams) may be differentiated on the basis of associated viewport identifications. For example, to this end, viewport identifications in GTP-U headers may be used. On the basis of such GTP-U headers including viewport identifications, the RAN may map image part data (e.g. traffic streams) to appropriated DRBs.

The method may further comprise
providing, from the network to the user equipment, image part data to the user by
transmitting the viewport identifications from the user to the network, wherein
the determining for each of the at least two user viewports an image part data including image data of the image portion to be provided to the user is carried out on the basis of the viewport identifications received from the user.

For example, as part of the L2 signaling (enhanced buffer status report eBSR or packet data convergence protocol PDCP control PDU), a user equipment may include viewport identifications so that the gNB may differentiate the resource request for high quality image versus low quality image The method may further comprise
agreeing between the network and the user that rules with respect to quality of service for the viewports are respectively also applied to uplink communication from the user to the network being related to the respective viewport.

For example, the agreement may by an agreement between network and user (particularly, his user equipment) to use Reflective QoS.

According to a further aspect, the present disclosure provides an apparatus comprising
at least one processor; and
at least one memory including computer program code;
the at least one memory and the computer code configured to, with the at least one processor, cause the communication network at least to perform:
determining at least two viewports for a user, each of the at least two user viewports corresponding to a portion of an VR image to be provided to the user, wherein the VR image is represented by image data, the image data comprising at least two image part data each thereof being associated to a respective part of the image, associating a viewport identification to each of the at least two user viewports, determining for each of the at least two user viewports an image part data including image data of the image portion to be provided to or received from the user, associating the viewport identifications respectively to the image part data being determined for the user viewport assigned to the respective viewport identification.

For the apparatus, the at least one memory and the computer code may be configured to, with the at least one processor, cause the apparatus at least to perform:

creating a packet detection rule based the viewport identification for detecting traffic of a portion of the image associated with the viewport identification.

For example, an Application server may provide (or may have access to) the image part data (e.g. traffic streams) on the basis of which the VR image may by displayed.

The AS may be capable of differentiating VR image data traffic streams for, e.g., a center part of a current FoV for a user and parts at the edges of the FoV. On this basis of such a differentiation, the AS may determine respective viewports and associate viewport identifications thereto.

The AS may provide source-destination information indicating from source the traffic streams are provided and to which destination (e.g. user) the traffic streams are intended. For example, to this end 5-tuples may be used.

The AS may also the provide viewport identifications together with the respective source-destination information The source-destination information and the viewport identifications may be considered as rules for traffic detection.

A Policy and Charging Control PCC of the network (e.g. 5GS PCC) may forward the traffic detection rules, e.g., to a Session Management function SMF the network (e.g. 5GS SMF).

For the apparatus, the at least one memory and the computer code may be configured to, with the at least one processor, cause the apparatus at least to perform:

providing, from the network to the user equipment, image part data to the user according to the corresponding associated viewport identification.

For the apparatus, the at least one memory and the computer code may be configured to, with the at least one processor, cause the apparatus at least to perform:

providing, from the network to the user equipment, image part data to the user by
creating a separate data flow for image part data, wherein
the data flows respectively support a quality of service corresponding to the viewport identification assigned to the respective image part data.

For example, a Session Management Function SMF, preferably a 5GS SMF, may create, on the basis of the viewport identifications, different QoS flows for the respective image part data (e.g. traffic streams).

For the apparatus, the at least one memory and the computer code may be configured to, with the at least one processor, cause the apparatus at least to perform:

providing, from the network to the user equipment, image part data to the user by
creating a common data flow supporting common quality of service, wherein
the common quality of service supports an image quality at least corresponding with a best image quality of one of the viewport identifications,
image part data is provided in association with the respective assigned viewport identification.

For example, a Session Management Function SMF, preferably a 5GS SMF, which, on the basis of the viewport identifications, may create one QoS flow for the image part data.

Then, the viewport identification may be provided as information for a downstream entity taking care of the further handling of the image part data (e.g. traffic streams). For example, such a downstream entity may be a User Plane Function that receives the viewport identifications as part of Packet Detection Rules PDR provided from the SMF.

For further downstream handling of the image part data (e.g. traffic streams), the viewport identifications may be included into header information for use at a downstream entity. For example, the UPF may include the viewport identifications respectively into GTP-U header.

For the apparatus, the at least one memory and the computer code may be configured to, with the at least one processor, cause the apparatus at least to perform:

providing, from the network to the user equipment, image part data to the user by
defining at least two data flows each having a quality of service,
mapping image part data different data radio bearers based on 5G QoS identifier and the viewport identification.

For example, a Session Management Function SMF, preferably a 5GS SMF, may define the at least two QoS flows on the basis of the viewport identifications.

For the apparatus, the at least one memory and the computer code may be configured to, with the at least one processor, cause the apparatus at least to perform:

mapping each data flow to a data radio bearer supporting the quality of service of the respective data flow and/or the viewport identification.

For the apparatus, the at least one memory and the computer code may be configured to, with the at least one processor, cause the apparatus at least to perform:

marking a packet of each data flow with a viewport identification in a GPRS Tunneling Protocol GTP header based on the packet detecting rule.

For the apparatus, the at least one memory and the computer code may be configured to, with the at least one processor, cause the apparatus at least to perform:

including the viewport identification in a Medium Access Control MAC control element.

For the apparatus, the at least one memory and the computer code may be configured to, with the at least one processor, cause the apparatus at least to perform:

including the viewport identification in an enhanced buffer status report eBSR or packet data convergence protocol PDCP control packet unit by the user equipment.

The mapping may be carried out by a gNB, preferably a 5GS gNB, on the basis of the viewport identifications.

The mapping may be based on viewport identification provided in header information for use at a downstream entity, in GTP-U header(s).

The gNB may use the ability of 5GS to have more than one 5QI within the same QoS flow. For example, a 5QI indicating a QoS level may be(also) as indicator for a quality level of image part data (e.g. traffic streams). To this, e.g., different 5QIs may be respectively assigned to different viewports. Then, the gNB may use a 5QI as information to which DRB the image part data (e.g. traffic streams) for a viewport should be mapped to.

The image part data (e.g. traffic streams) may be differentiated by the UPF on the basis of viewport identification.

To this, e.g., the SMF may install rules for data detection by the UPF on the basis of viewport identification. Such rules allow the UPF to determine image part data (e.g. traffic streams) for each viewport. Such packet detection rules (i.e. rules including viewport identification) allow the UPF to differentiate image part data (e.g. traffic streams) with respect to viewports.

Further, e.g., the SMF may install rules for the UPF to differentiate, on the basis of viewport identification, image qualities of different viewports. For example, the UPF may use such rules to determine that a first viewport identified by a first viewport identification requires a first image quality, that a second viewport identified by a second viewport identification requires a second image quality, etc.

Also, the SMF may assign different QoS flows to the image part data (or traffic streams) on the basis of the viewport identifications. For example, a QoS flow supporting high(er) image quality may be assigned to image part data (e.g. traffic streams) for a central portion of a FoV, while a QoS flow supporting low(er) image quality may be assigned to image part data for a peripheral portion of the FoV.

The UPF may map, based on the viewport identification, the image part data (e.g. traffic streams) accordingly to the respective QoS flow assigned by the SMF.

For the apparatus, the at least one memory and the computer code may be configured to, with the at least one processor, cause the apparatus at least to perform:
  providing, from the network to the user equipment, image part data to the user by
    associating an image quality indicator to image part data,
    transmitting image part data together with the respective image quality indicator via a common data flow supporting a common quality of service.

Here it may be assumed that a single, common QoS flow is used to convey the image part data. Further, it is assumed that at least two different quality indicators, e.g. 5QIs, are assigned to the common QoS flow in order to differentiate at least two different viewports and respective image qualities. On the basis of the quality indicators (e.g. 5QIs), the network may use the appropriate quality indicators (e.g. 5QIs) for the different image part data (e.g. traffic streams).

For example, the 5GS core network may assign two or more 5QIs for the same QoS flow. Also, there may be an assigning of 5QIs to different viewports and their identification, respectively. For example, a 5QI supporting high(er) image quality may be assigned to image part data (e.g. traffic stream) for a central portion of a FoV, while a 5QI supporting low(er) image quality may be assigned to image part data (e.g. traffic stream) for a peripheral portion of the FoV.

The gNB may use, from the assigned 5QIs, an appropriate one for one viewport, while another appropriate one is used for another viewport.

Particularly, the gNB may be used 5QIs as indicators to map image part data (e.g. traffic streams) to different DRBs within the same QoS flow.

Further, within the same QoS flow, image part data (e.g. traffic streams) may be differentiated on the basis of associated viewport identifications. For example, to this end, viewport identifications in GTP-U headers may be used. On the basis of such GTP-U headers including viewport identifications, the RAN may map image part data (e.g. traffic streams) to appropriated DRBs.

For the apparatus, the at least one memory and the computer code may be configured to, with the at least one processor, cause the apparatus at least to perform:
  mapping image part data to a data radio bearer supporting the quality of service of the respective image quality indicator.

For the apparatus, the at least one memory and the computer code may be configured to, with the at least one processor, cause the apparatus at least to perform:
  providing, from the network to the user equipment, image part data to the user by
    transmitting the viewport identifications from the user to the network, wherein
    the determining for each of the at least two user viewports an image part data including image data of the image portion to be provided to the user is carried out on the basis of the viewport identifications received from the user.

For example, as part of the L2 signaling (enhanced buffer status report eBSR or packet data convergence protocol PDCP control PDU), a user equipment may include viewport identifications so that the gNB may differentiate the resource request for high quality image versus low quality image For the apparatus, the at least one memory and the computer code may be configured to, with the at least one processor, cause the apparatus at least to perform:
  agreeing between the network and the user that rules with respect to quality of service for the viewports are respectively also applied to uplink communication from the user to the network being related to the respective viewport.

For example, the agreement may by an agreement between network and user (particularly, his user equipment) to use Reflective QoS.

The apparatus may comprise a network node or a user equipment.

In the case the apparatus comprises a network node, the network node may comprise at least one of UPF, SMF, AF, PCF, gNB According to a further aspect, the present disclosure provides a method of operating a user equipment
  determining at least two viewports for a user, each of the at least two user viewports corresponding to a portion of an VR image to be provided to the user, wherein the VR image is represented by image data, the image data comprising at least two image part data each thereof being associated to a respective part of the image,
  associating a viewport identification to each of the at least two user viewports,
  transmitting the viewport identifications from the user to a network.

For example, as part of the L2 signaling (enhanced buffer status report eBSR or packet data convergence protocol PDCP control PDU), a user equipment may include viewport identifications so that the gNB may differentiate the resource request for high quality image versus low quality image The method of operating a user equipment may further comprise
  agreeing with the network that rules with respect to quality of service for the viewports are respectively also applied to uplink communication from the user to the network being related to the respective viewport.

For example, the agreement may by an agreement between network and user (particularly, his user equipment) to use Reflective QoS.

According to a further aspect, the present disclosure provides user equipment that comprises
at least one processor; and
at least one memory including computer program code;
the at least one memory and the computer code configured to, with the at least one processor, cause the user equipment at least to perform:
determining at least two viewports for a user, each of the at least two user viewports corresponding to a portion of an VR image to be provided to the user, wherein the VR image is represented by image data, the image data comprising at least two image part data each thereof being associated to a respective part of the image,
associating a viewport identification to each of the at least two user viewports,
transmitting the viewport identifications from the user to a network.

For example, as part of the L2 signaling (enhanced buffer status report eBSR or packet data convergence protocol PDCP control PDU), a user equipment may include viewport identifications so that the gNB may differentiate the resource request for high quality image versus low quality image For the user equipment, the at least one memory and the computer code may be configured to, with the at least one processor, cause the user equipment at least to perform:
agreeing with the network that rules with respect to quality of service for the viewports are respectively also applied to uplink communication from the user to the network being related to the respective viewport.

For example, the agreement may by an agreement between network and user (particularly, his user equipment) to use Reflective QoS.

According to a further aspect, the present disclosure provides a computer program comprising instructions stored thereon for carrying out one of the methods indicated above.

According to a further aspect, a computer program product comprises program instructions stored on a computer readable medium to execute the method steps according to any one of the method embodiments outlined above when said program is executed on a computer.

In the following some more specific aspects of the present disclosure are given, wherein each aspect may be used alone or in combination with at least one of the other aspects:
For PDU Session and QoS flows serving VR traffic, PCF may provide policies regarding view port information and Reflective QoS such that the SMF Install N4 rules in the UPF ensuring that the UPF activates RQI only for traffic within the view port. Then, the AN may also activate Reflective QoS. Based on this, the UE may use the derived QoS rules to determine mapping of UL QoS flows to appropriate DRB allowing that the center and edge tiles may be differentiated for both UL and DL.
Ability for 5GS to use viewport positioning information for activating Reflective QoS and determining RQI on a per packet basis. This may allow that both downlink (by the UPF) and uplink (by the UE) are differentiated in the same way.
PCF may provide viewport identification (VPI) as part of PCC rules to SMF. This may be applicable only for DL or UL or both.
SMF may provide viewport identification (VPI) as part of N4 rules.
UPF may map User Plane traffic to QoS flows based on the SDF templates within PDR and view port information.
UPF may transmit packets in a single tunnel between 5GC and RAN. Then, the UPF may include the QFI and view port differentiator in the encapsulation header.
SMF may install N4 rules in the UPF so that it may activate Reflective QoS on the DL on a per packet by setting RQI based on PDR and view port information.
UPF may set the RQI based on PDR and view port information for QoS Flows with XR traffic The above-noted aspects and features may be implemented in systems, apparatuses, methods, articles and/or non-transitory computer-readable media depending on the desired configuration. The subject matter described herein may be implemented in and/or used with a number of different types of devices, including but not limited to cellular phones, tablet computers, wearable computing devices, portable media players, and any of various other computing devices.

This summary is intended to provide a brief overview of some of the aspects and features according to the subject matter described in this document. Accordingly, it will be appreciated that the above-described features are merely examples and should not be construed to narrow the scope of the subject matter described herein in any way. Other features, aspects, and advantages of the subject matter described herein will become apparent from the following detailed description, drawings and claims.

BRIEF DESCRIPTION OF THE DRAWINGS

A better understanding of the subject matter described herein can be obtained when the following detailed description of various embodiments is considered in conjunction with the following drawings, in which.

DETAILED DESCRIPTION

Figure 1:
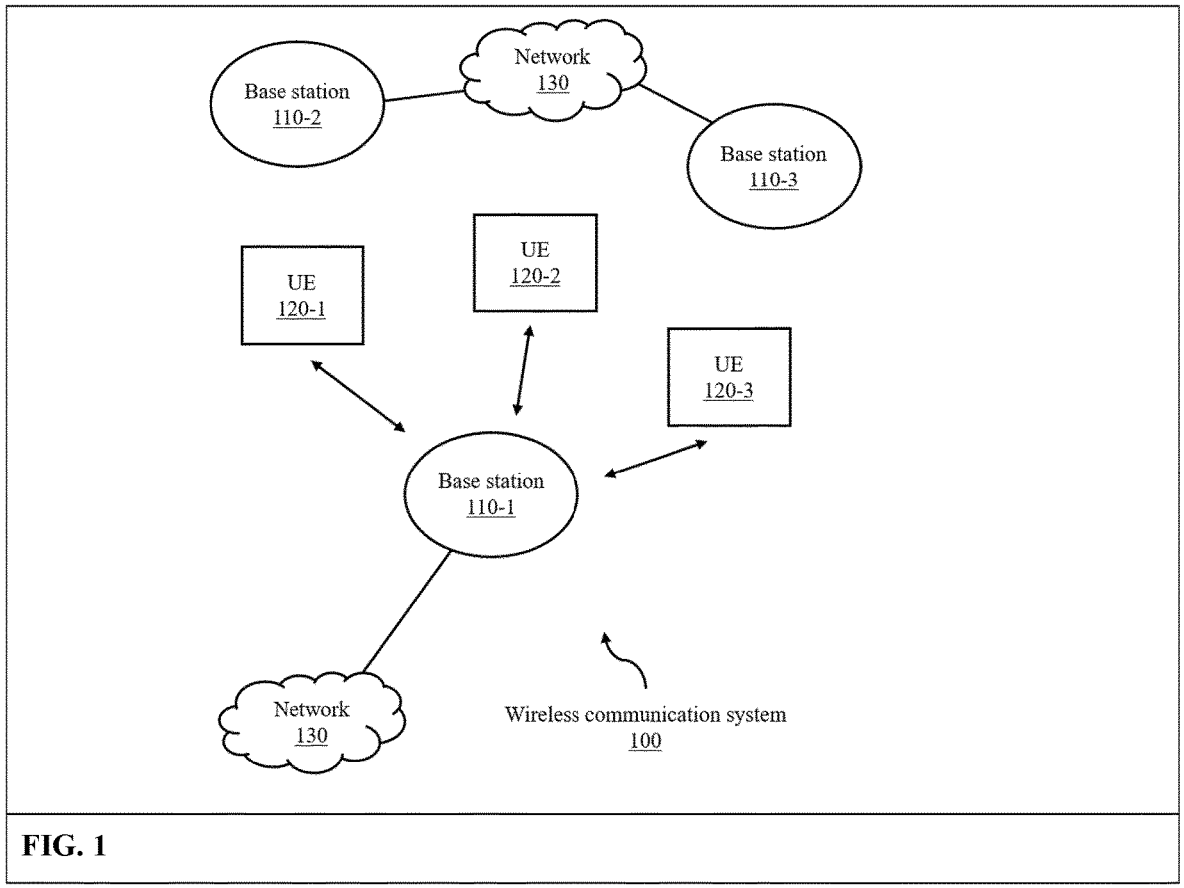
FIG. 1 illustrates a simplified wireless communication system in line with present disclosure.

FIG. 1 illustrates a simplified wireless communication system 100, according to some embodiments. It is noted that the system of FIG. 1 is merely one example of a possible system, and that features of the subject matter described herein may be implemented in any of various systems, as desired.

As shown, the wireless communication system 100 includes a base station 110-1 which communicates over a transmission medium with one or more user devices 120. In FIG. 1, only three user devices 120-1, 120-2, and 120-3 are shown, without limitation. Each of the user devices 120-1, 120-2, and 120-3 may be referred to herein as a "user equipment" (UE). Thus, the user devices 120 are referred to as UEs or UE devices.

As used herein, the term "user equipment" may refer to any of various types of computer systems devices which are mobile or portable and which perform wireless communications. Examples of UEs include mobile telephones or smart phones, portable gaming devices, laptops, wearable devices (e.g., smart watch, smart glasses), Personal Digital Assistants (PDAs), portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

The base station (BS) 110-1 may be a base transceiver station (BTS) or cell site (a "cellular base station"), and may include hardware that enables wireless communication with the UEs 120.

As used herein, the term "base station" has the full breadth of its ordinary meaning, and at least includes a wireless communication station installed at a fixed location and used to communicate as part of a wireless telephone system or radio system.

The communication area (or coverage area) of the base station 110 may be referred to as a "cell." The base station 110 and the UEs 120 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. If the base station 110-1 is implemented in the context of LTE, it may alternately be referred to as an "eNodeB" or "eNB". If the base station 110-1 is implemented in the context of 5G NR, it may alternately be referred to as "gNodeB" or "gNB".

As shown, the base station 110-1 may also be equipped to communicate with a network 130 (e.g., a core network of a cellular service provider, a telecommunication network such as a public switched telephone network (PSTN), and/or the Internet, among various possibilities). Thus, the base station 110-1 may facilitate communication between the user devices 120 and/or between the user devices 120 and the network 130. In particular, the cellular base station 110-1 may provide UEs 120 with various telecommunication capabilities, such as voice, SMS and/or data services.

The base station 110-1 and other similar base stations (such as base stations 110-2 and 110-3) operating according to the same or a different cellular communication standard may thus be provided as a network of cells, which may provide continuous or nearly continuous overlapping service to UEs 120 and similar devices over a geographic area via one or more cellular communication standards.

Thus, while base station 110-1 may act as a "serving cell" for UEs 120 as illustrated in FIG. 1, each UE 120 may also be capable of receiving signals from (and possibly within communication range of) one or more other cells (which might be provided by base stations 110 and/or any other base stations), which may be referred to as "neighboring cells". Such cells may also be capable of facilitating communication between user devices 120 and/or between user devices 120 and the network 130. Such cells may include "macro" cells, "micro" cells, "pico" cells, and/or cells which provide any of various other granularities of service area size. For example, base stations 110-1 and 110-2 illustrated in FIG. 1 might be macro cells, while base station 110-3 might be a micro cell. Other configurations are also possible.

In some embodiments, base station 110-1 may be a next generation base station, e.g., a New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

The UE 120 may be capable of communicating using multiple wireless communication standards. For example, the UE 120 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 120 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
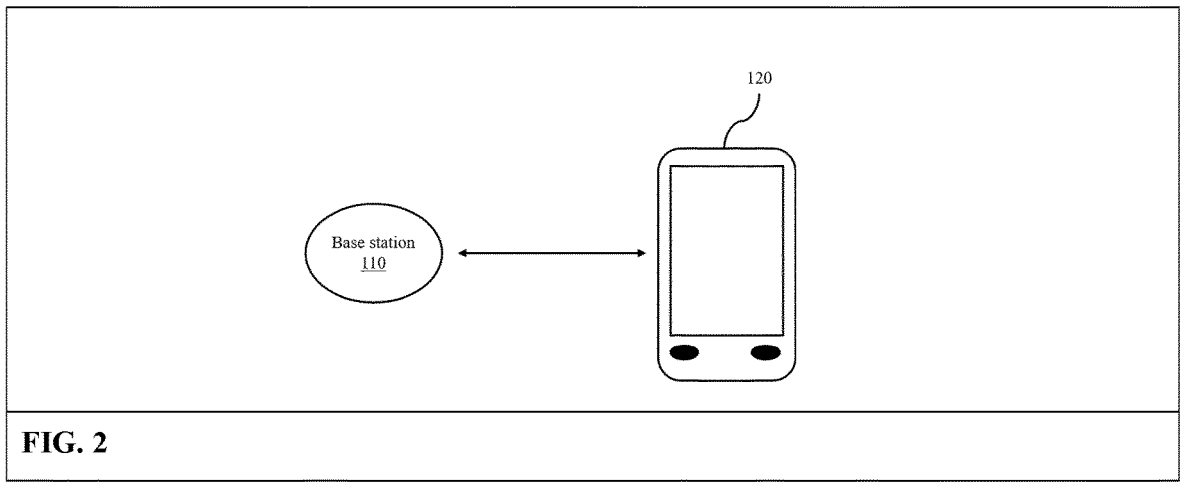
FIG. 2 illustrates a base station (BS) in communication with a user equipment (UE) in line with present disclosure.

FIG. 2 illustrates user equipment 120 (e.g., one of the devices 120-1, 120-2 and 120-3) in communication with a base station 110, according to some embodiments. The UE 120 may be a device with cellular communication capability such as a mobile phone, a hand-held device, a computer or a tablet, or virtually any type of wireless device.

The UE 120 may include a processor that is configured to execute program instructions stored in memory. The UE 120 may perform any of the method embodiments described herein by executing such stored instructions. Alternatively, or in addition, the UE 120 may include a programmable hardware element such as a field-programmable gate array (FPGA) that is configured to perform any of the method embodiments described herein, or any portion of any of the method embodiments described herein.

The UE 120 may include one or more antennas for communicating using one or more wireless communication protocols or technologies. In some embodiments, the UE 120 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 120 may share one or more parts of a receive and/or transmit chain between multiple wireless communication technologies, such as those discussed above.

In some embodiments, the UE 120 may include separate transmit and/or receive chains (e.g., including separate antennas and other radio components) for each wireless communication protocol with which it is configured to communicate. As a further possibility, the UE 120 may include one or more radios which are shared between multiple wireless communication protocols, and one or more radios which are used exclusively by a single wireless communication protocol. For example, the UE 120 might include a shared radio for communicating using either of LTE or 5G NR (or LTE or 1×RTT or LTE or GSM), and separate radios for communicating using each of Wi-Fi and Bluetooth™. Other configurations are also possible.

Figure 3:
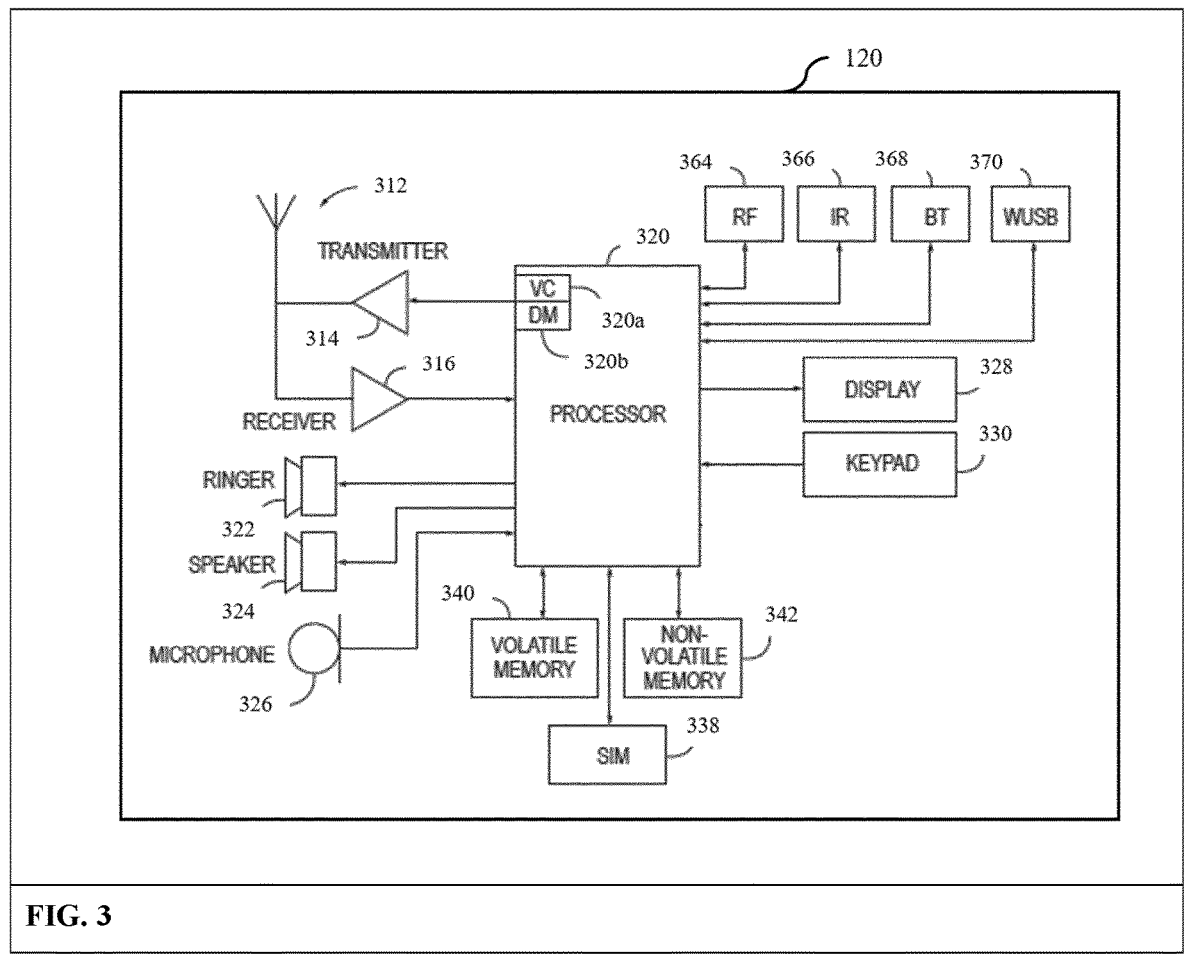
FIG. 3 illustrates a simplified block diagram of a UE in line with present disclosure.

FIG. 3 illustrates a simplified block diagram of a UE 120, according to some embodiments. It is noted that the block diagram of the UE 120 of FIG. 3 is only one example of a possible user device. According to embodiments, UE 120 may be a user device, a mobile device or mobile station, a wireless device or wireless station, a desktop computer or computing device, a mobile computing device (e.g., a laptop, notebook, or portable computing device), a tablet and/or a combination of devices, among other devices.

As shown, the UE 120 may include a set of components configured to perform core functions. For example, this set of components may be implemented as a system on chip (SOC), which may include portions for various purposes. Alternatively, this set of components may be implemented as separate components or groups of components for the various purposes. The set of components may be coupled (e.g., communicatively; directly or indirectly) to various other circuits of the UE 120.

The UE 120 may include at least one antenna 312 in communication with a transmitter 314 and a receiver 316. Alternatively, transmit and receive antennas may be separate. The UE 120 may also include a processor 320 configured to provide signals to and receive signals from the transmitter 314 and receiver 316, respectively, and to control the functioning of the UE 120. Processor 320 may be configured to control the functioning of the transmitter 314 and receiver 316 by effecting control signaling via electrical leads to the transmitter 314 and receiver 316. Likewise, the processor 320 may be configured to control other elements of the UE 120 by effecting control signaling via electrical leads connecting processor 320 to the other elements, such as a display or a memory. The processor 320 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 3 as a single processor, in some example embodiments the processor 320 may comprise a plurality of processors or processing cores.

The UE 120 may be capable of operating with one or more air interface standards, communication protocols, modulation types, access types, and/or the like. Signals sent and received by the processor 320 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the UE 120 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the UE 120 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the UE 120 may be capable of operating in accordance with 2.5G wireless communication protocols General Packet Radio Service (GPRS), Enhanced Data GSM Environment (EDGE), and/or the like. Further, for example, the UE 120 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The UE 120 may be additionally capable of operating in accordance with 3.9G wireless communication protocols, such as Long Term Evolution (LTE), Evolved Universal Terrestrial Radio Access Network (E-UTRAN), and/or the like. Additionally, for example, the UE 120 may be capable of operating in accordance with 4G wireless communication protocols, such as LTE Advanced, 5G, and/or the like as well as similar wireless communication protocols that may be subsequently developed.

It is understood that the processor 320 may include circuitry for implementing audio/video and logic functions of the UE 120. For example, the processor 320 may comprise a digital signal processor device, a microprocessor device, an analog-to-digital converter, a digital-to-analog converter, and/or the like. Control and signal processing functions of the UE 120 may be allocated between these devices according to their respective capabilities. The processor 320 may additionally comprise an internal voice coder (VC) 320*a*, an internal data modem (DM) 320*b*, and/or the like. Further, the processor 320 may include functionality to operate one or more software programs, which may be stored in memory. In general, the processor 320 and stored software instructions may be configured to cause the UE 120 to perform actions. For example, the processor 320 may be capable of operating a connectivity program, such as a web browser. The connectivity program may allow the UE 120 to transmit and receive web content, such as location-based content, according to a protocol, such as wireless application protocol (WAP), hypertext transfer protocol (HTTP), and/or the like.

The UE 120 may also comprise a user interface including, for example, an earphone or speaker 324, a ringer 322, a microphone 326, a display 328, a user input interface, and/or the like, which may be operationally coupled to the processor 320. The display 328 may, as noted above, include a touch sensitive display, where a user may touch and/or gesture to make selections, enter values, and/or the like. The processor 320 may also include user interface circuitry configured to control at least some functions of one or more elements of the user interface, such as the speaker 324, the ringer 322, the microphone 326, the display 328, and/or the like. The processor 320 and/or user interface circuitry comprising the processor 320 may be configured to control one or more functions of one or more elements of the user interface through computer program instructions, for example, software and/or firmware, stored on a memory accessible to the processor 320, for example, volatile memory 340, non-volatile memory 342, and/or the like. The UE 120 may include a battery for powering various circuits related to the mobile terminal, for example, a circuit to provide mechanical vibration as a detectable output. The user input interface may comprise devices allowing the UE 120 to receive data, such as a keypad 330 (which can be a virtual keyboard presented on display 328 or an externally coupled keyboard) and/or other input devices.

As shown in FIG. 3, the UE 120 may also include one or more mechanisms for sharing and/or obtaining data. For example, UE 120 may include a short-range radio frequency (RF) transceiver and/or interrogator 364, so data may be shared with and/or obtained from electronic devices in accordance with RF techniques. The UE 120 may include other short-range transceivers, such as an infrared (IR) transceiver 366, a Bluetooth™ (BT) transceiver 368 operating using Bluetooth™ wireless technology, a wireless universal serial bus (USB) transceiver 370, a Bluetooth™ Low Energy transceiver, a ZigBee transceiver, an ANT transceiver, a cellular device-to-device transceiver, a wireless local area link transceiver, and/or any other short-range radio technology. The UE 120 and, in particular, the short-range transceiver may be capable of transmitting data to and/or receiving data from electronic devices within the proximity of the apparatus, such as within 10 meters, for example. The UE 120 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The UE 120 may comprise memory, such as a subscriber identity module (SIM) 338, a removable user identity module (R-UIM), an eUICC, an UICC, and/or the like, which may store information elements related to a mobile subscriber. In addition to the SIM, the UE 120 may include other removable and/or fixed memory. The UE 120 may include volatile memory 340 and/or non-volatile memory 342. For example, the volatile memory 340 may include Random Access Memory (RAM) including dynamic and/or static RAM, on-chip or off-chip cache memory, and/or the like. The non-volatile memory 342, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 340, the non-volatile memory 342 may include a cache area for temporary storage of data. At least part of the volatile and/or non-volatile memory may be embedded in the processor 320. The memories may store one or more software programs, instructions, pieces of information, data, and/or the like which may be used by the apparatus for performing operations disclosed herein.

The memories may comprise an identifier, such as an International Mobile Equipment Identification (IMEI) code, capable of uniquely identifying the UE 120. The memories may comprise an identifier, such as an international mobile equipment identification (IMEI) code, capable of uniquely identifying the UE 120. In the example embodiment, the processor 320 may be configured using computer code stored at memory 340 and/or 342 to cause the processor 320 to perform operations disclosed herein.

Some of the embodiments disclosed herein may be implemented in software, hardware, application logic, or a combination of software, hardware, and application logic. The software, application logic, and/or hardware may reside on the memory 340, the processor 320, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 3, computer-readable medium may comprise a non-transitory computer-readable storage medium that may be any media that can contain or store the instructions for use by or in connection with an instruction execution system, apparatus, or device, such as a computer.

The present disclosure relates to communication environments supporting augmented reality AR and virtual reality VR media services. AR and VR differ in several aspects. However, with a view on the technical aspects of AR and VR in relation to the present disclosure, AR and VR may be considered as synonyms. Therefore, and for the sake of simplification the term VR will be used here.

In the following, examples, embodiments variations and modifications are described with reference to 3GPP communication networks and components thereof. 3GPP technical terms and their meaning and understanding can be found, for example, in 3GPP document TR 21.905 that represents knowledge of the skilled person for the present disclosure that is not repeated here (and which is incorporated by reference—at least for jurisdictions where such incorporation is allowable). Particularly, the present disclosure can be seen in the context of 3GPP VR media service, as e.g. outlined in 3GPP document TR 26.918 that represents knowledge of the skilled person for the present disclosure that is not repeated here (and which is incorporated by reference—at least for jurisdictions where such incorporation is allowable).

The following explanations are given with reference to 3GPP VR services for illustration, but are not meant in any limiting way. Rather, the principles underlying 3GPP VR services apply to VR applications in general.

Figure 4:
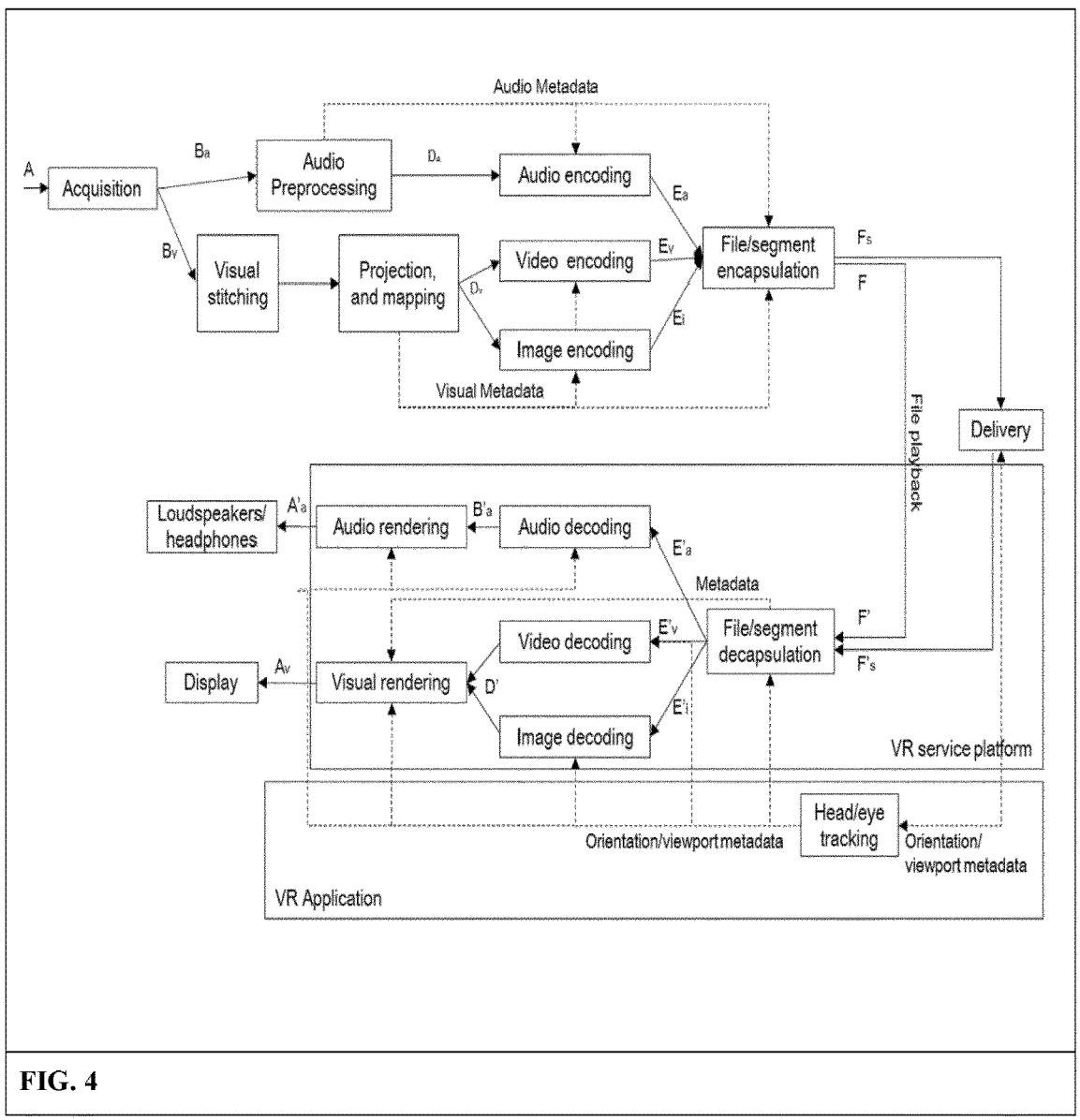
FIG. 4 illustrates an exemplary architecture for VR services in line with the present disclosure.

As described in 3GPP TR 26.918, the typical architecture of file-based or segment-based distribution system of Virtual Reality (VR) content like HTTP-based and DASH-based download services is illustrated in FIG. 4.

VR content (A) is captured by multiple video cameras and microphone arrays pointing in different directions and results in a video and audio signals (By and Ba). Before the encoding (Ev, Ea, Ei) is carried out, the content, which is captured by several cameras and microphones, is stitched together and the stitched image is projected onto a three-dimensional projection structure (e.g. a sphere). The image data on the projection structure is further arranged onto a two-dimensional projected picture and regions of the picture are mapped onto a packed picture, assuming the optional region-wise packing is used. After encoding, the content is split into segments and encapsulated into ISO Base Media File Format (ISOBMFF) segments (F) together with additional metadata information that provides additional signaling for DASH clients. Content may be made available in different viewpoints, so the same content may be encoded in multiple versions. Segments corresponding to different viewports and time period of the stream are stored into files that are downloaded using for example Dynamic Adaptive Streaming over HTTP (DASH) protocol (which is knowledge of the skilled person and outlines, e.g., in the standard ISO/EC 23009-1, which is incorporated by reference—at least for jurisdictions where such incorporation is allowable).

At the receiver side, segments are delivered over HTTP using unicast, multicast or broadcast delivery. After downloading the file segments (F'), the client/receiver decapsulates the coded bitstreams (E'v, E'a, and E'i) and extracts the corresponding metadata. Then, the video and audio streams are decoded and rendered on the client device using the extracted metadata according to the viewing orientation of the user.

The DASH streaming protocol, the decoding module and rendering system, inter alia, influence the quality of experience QoE perceived by the user. For example, their activity needs to be coordinated in order to support a seamless streaming of the VR content. To illustrate how these three components can be affected by resource allocation decisions by, e.g. the network entities, VR content representation and streaming is outlined in the following.

All VR devices like a Head Mounted Device (HMD) display only a fraction of the omnidirectional 3D scene (i.e., the 360-degree scene around the observer/user). This portion of the space is called Field of View (FoV) and its digital representation is the only part that need to be provided to the user. For example, using DASH-based streaming, the 3D image content may by spatially divided into independent subpictures or tiles. Often multiple representations of the same tile are provided by storing them at different qualities in terms of resolution, compression, and framerate.

Figure 5:
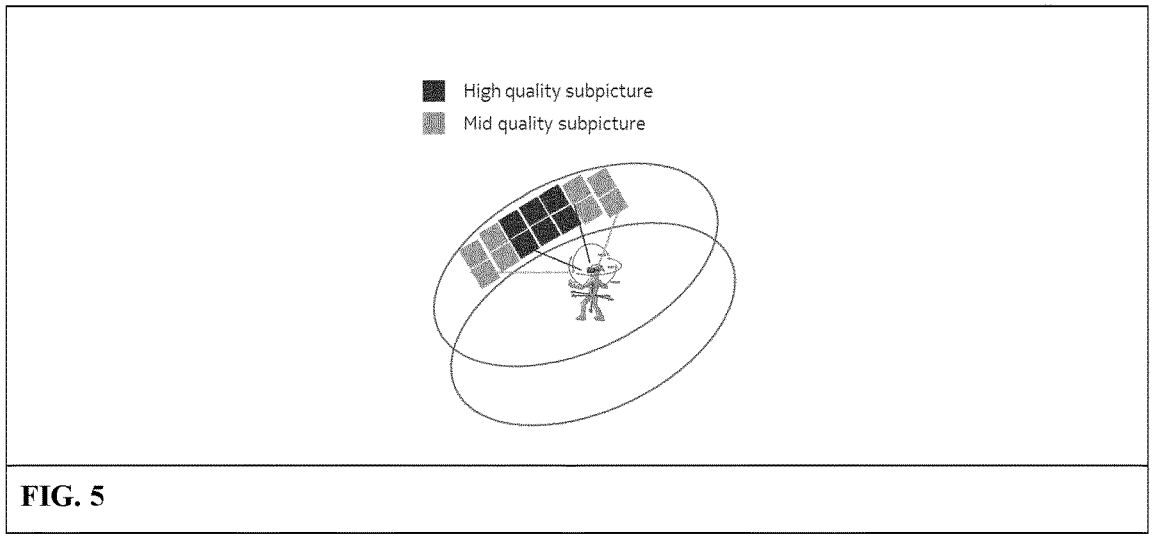
FIG. 5 is a simplified illustration of a FoV for a user using an HMD arrangement in line with the present disclosure.

This allows providing image data adapted to the requirements and preferences at the used. For example, visual recognition is better within the central area of vision as compared with peripheral areas where visual acuity, pattern recognition and color vision decrease. Thus, FoV parts at the edges may have a lower resolution than FoV parts in more centered parts. Further, visual sensitivity to moving objects also decreases peripherally, but less so than other visual functions. This may be taken into account by using rather similar frame rates throughout the FoV FIG. 5 is a simplifying illustration of a FoV for a user using an HMD arrangement. The image data sets for the image that is to be presented in the FoV are provided to the user's HMD arrangement, which usually decodes the image data sets before displaying the same. For example, in the case of DASH, the DASH client at the user obtains (e.g. via download, push, etc.) a representation (i.e. image data) for each part of the image to be displayed (in the form of tiles), decodes and displays them.

As illustrated in FIG. 5, the image data set for the image parts (tiles) at the left and right hand sides of the FoV (in FIG. 5, the two columns at the right and the two columns at the of the FoV) may have a lower quality, e.g. in terms of resolution, color depth, etc. as compared with image parts (tiles) in the center of the FoV (in FIG. 5, the three columns in the midst).

Once the image data sets for all parts/tiles in the FoV are available (e.g. downloaded) at the user, the user device can be rendered the image data sets to generate a 3D representation in the FoV and display the same to the user.

When and/or which image data is provided and/or obtained be the user device, may be triggered, for example, head and user movements, respectively, which may later the FoV, a need to have image data for the next portion of a video, etc.

FoV can be considered as the part of a VR image that is provided to a user as visible part of the VR image. As set forth above, a 3D omnidirectional VR image comprises a plurality of sub-images or tiles. For the FoV, only those tiles that contribute to the FoV image are provided to the user. From the perspective of a user, it can be said that the FoV comprises several viewports. A viewport, from the user perspective, is like a window through which one can see a part of the FoV image. For example, a viewport may cover a central region of the FoV, while other viewports may cover regions of the FoV surrounding the FoV center region.

In 3GPP, in the current QoS framework data traffic from a given source (e.g. application, source address, port, etc.) targeted towards a certain destination (e.g. address, port etc.) is mapped to the same Quality of Service QoS Flow. Thus, VR image data provided by an application to user would be offered the same QoS. This may result in inefficient use of resources because, for example, for some image data a lower QoS may be sufficient, while other image data may require a higher QoS.

This situation is not limited to 3GPP VR services, but exists in any environment where VR image data are used. VR image data is transported from its source to a sink (e.g. VR user device processing the VR image data, display, etc.). Also, in cases where VR image data source and display are coupled via cable etc. (e.g. game consoles) the question of optimized QoS between source and sink arises.

The present disclosure addresses this general aspect and provides solutions that can be used in telecommunication environments like 3GPP (e.g. EPS, 5GS) and also in other scenarios involving transmission of VR image data from source to sink. The following description of solution with reference to 3GPP are therefore only exemplary and not limiting.

According to the present solution, one aspect is to differentiate between VR image data in terms of QoS, for example, between VR image data for center region(s) of a FoV with better image quality (e.g. higher resolution) and VR image data for edge region(s) of the FoV with worse image quality (e.g. lower resolution).

Another aspect of the present disclosure is to differentiate between data streams for VR image data, for example, between data streams providing a higher QoS for VR image data for center region(s) of a FoV with better image quality (e.g. higher resolution) and data streams providing a higher QoS for VR image data for edge region(s) of the FoV with worse image quality (e.g. lower resolution).

A VR image is represented by image data. As set forth above, a VR image is subdivided into sub-images or tiles, each of which being represented by respective image data. The latter image data represent a part of the image and comprise, inter alia, data conveying the visible content and parameter like resolution and framerate. Starting therefrom, the designation image part data sets is used. Image part data sets are conveyed as traffic streams.

Figure 6:
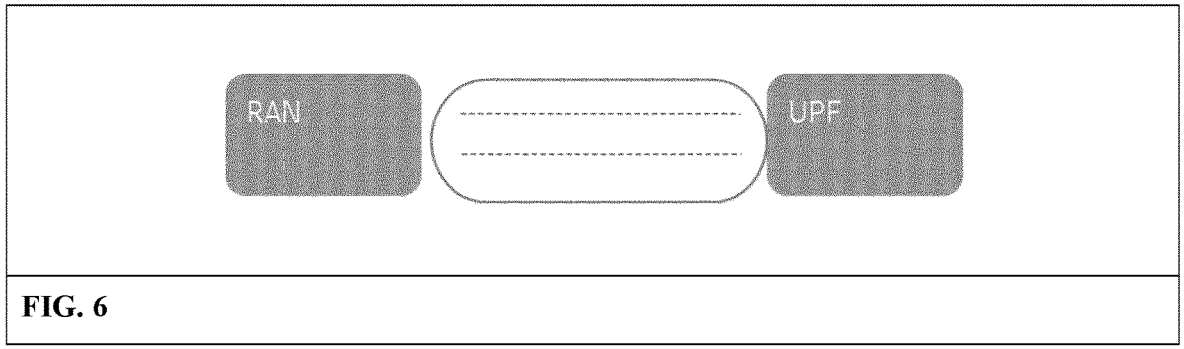
FIG. 6 illustrates an exemplary VR image data handling in line with the present disclosure.

FIG. 6 illustrates an exemplary VR image data handling in line with the present disclosure. FIG. 6 procedures can be considered as scenarios where image data for a VR image comes from a source (e.g. VR application) and is differentiated according to the viewport for which the image data is intended. For example, QoS flows for traffic coming from a single application with 5-tuples can be differentiated on the basis of ETH or IP filter. Having a FoV, the source side (e.g. VR application) determines respective viewports. A viewport may be represented by a single image part data set, but generally more than one, several image part data sets are necessary. On the basis of the viewports, the respective image part data sets are determined. The image part data sets may be respectively provided in the form of a data or traffic stream. In other words, a viewport may be associated to a traffic stream that supplies the image part data sets for that viewport.

To each viewport, a viewport identification is associated. In other words, each viewport gets a label indicating which part of the FoV the viewport belongs to.

A viewport identification can, for example, indicate that a viewport belongs to a center or edge region of the FoV. Such information may be included in the viewport identification. Further, a viewport identification may be a classifier that merely indicates a class the viewport identification belongs. Such a class may indicate which type the viewport associated to the viewport identification has, e.g., viewport belongs to a center or edge region of the FoV.

Viewport identifications could be made generic (e.g. sub-flow identifier) in order to support QoS differentiation within a common QoS Flow in a generic manner.

The way how viewport identifications are to be understood and handled can be defined in rules within the network. For example, in 3GPP such rules can established a traffic detections rules, which may be distributed in the network by the PCC Policy and Charging Control.

In 3GPP, a source in form of an application may provide the image part data sets or the respective traffic streams as 5 tuples together with the viewport identifications.

To forward the image part data sets and the respective traffic streams, different QoS flows can be defined/created. In 3GPP, the latter may be accomplished by the SMF Session Management Function.

In the case of different QoS flows, each QoS flow may have a different QoS that is established on the basis of the viewport identifiers of the image part data set the QoS flow will carry.

In this way, QoS flows having a QoS being adapted to the respective viewport can be provided.

Further, the image part data sets and the respective traffic streams may be forwarded via a common QoS flow. In 3GPP, a common QoS flow may be created by the SMF Session Management Function.

The viewport identifications may be also forward in connection with the common QoS flow. For example, in 3GPP the viewport identifications may be provided as part of PDR (packet detection rules) to the User Plane Function UPF. Then, the UPF uses the viewport identifications to mark the traffic accordingly in the GTP-U header.

Figure 7:
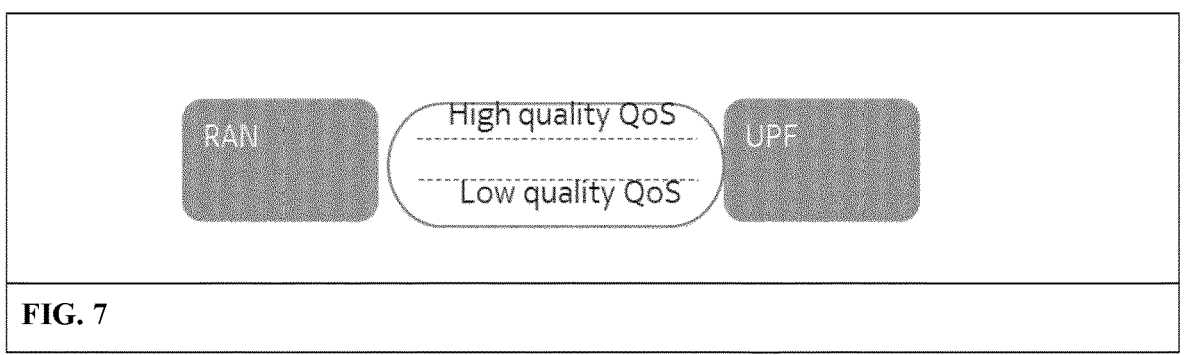
FIG. 7 illustrates an exemplary VR image data handling in line with the present disclosure.

FIG. 7 illustrates an exemplary VR image data handling in line with the present disclosure. FIG. 7 procedures can be considered as scenarios where image data for a VR image are mapped to different Data Radio Bearers DRBs in dependence of the respective viewports.

Generally speaking, that multiple 5QI(s) can be assigned for a single QoS Flow. Then, the viewport identification may be used to differentiate the 5QI for traffic within the QoS flow. For instance, traffic in front of the eyes appear with better quality compared to traffic on the side and so on.

As explained in greater detail in the following, traffic may be differentiated by UPF based on PDR (packet detection rule) including view port information. SMF assigns different QoS Flows accordingly and UPF maps to different QoS Flows accordingly. SMF installs rules in the UPF based on policies to differentiate picture quality based on view port position; SMF also installs packet detection rules to differentiate based on viewport.

As above, viewport identifications are associated to the different viewports and the image part data sets (or the respective traffic) together the viewport identifications are provided to an entity that maps, on the basis of the viewport identifications, the image part data sets respectively to radio data bearers supporting a QoS suitable for the respective image part data sets and viewport, respectively.

The UPF may use the viewport identifications in the PDR to differentiate between the different image part data sets (or traffic thereof). The SMF may assign different QoS Flows that offer a QoS sufficient for the different viewports and their image part data sets (traffic). On the basis of the viewport identifications, the UPF may map the image part data sets (or traffic thereof) to QoS flows. To this end, the SMF may install rules for the UPF to differentiate picture quality based on viewport position so that the UPF can determine on the basis of the viewport identifications to which QoS flow the data are to be mapped.

On the basis of the QoS of the QoS flows, it may be determined which DRB would be suitable; then, the different QoS flows may be mapped to respective DRBs. In 5GS, this can be accomplished by an gNB.

5GS allows to assign several different quality identifiers 5QI within the same QoS flow. The gNB may use different 5QIs as an indicator to map traffic (here image part data sets) within a common QoS Flow to different DRBs.

FIG. 7 procedures may be used in download direction.

Figure 8:
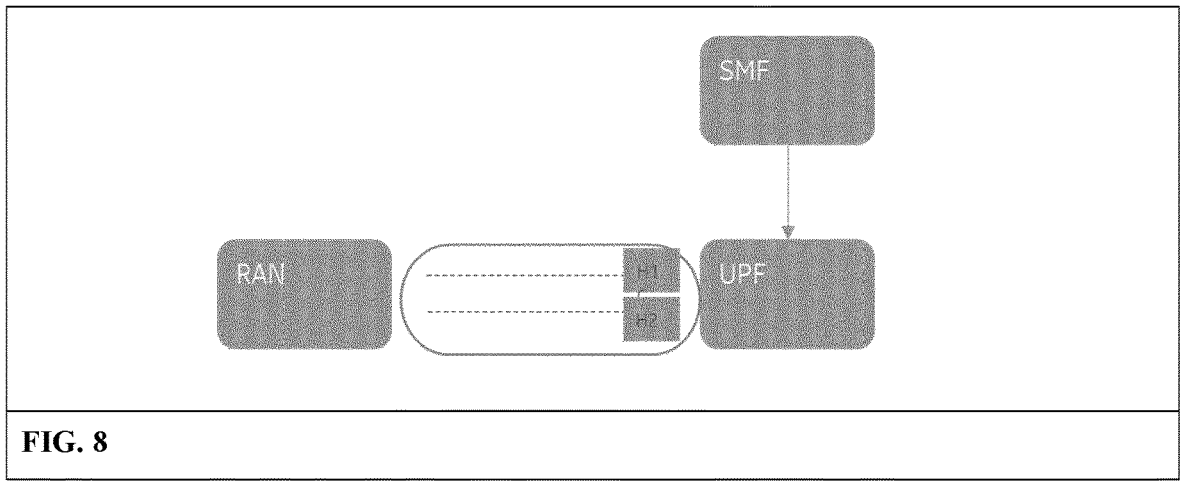
FIG. 8 illustrates an exemplary VR image data handling in line with the present disclosure.

FIG. 8 illustrates an exemplary VR image data handling in line with the present disclosure. FIG. 8 procedures can be also considered as scenarios where image data for a VR image are mapped to different Data Radio Bearers DRBs in dependence of the respective viewports.

FIG. 8 illustrates that image part data sets (or respective traffic) may be mapped to same QoS Flow, wherein image part data sets related to different viewports may be differentiated by GTP Header, e.g. GTP headers based on viewport identifications. Based on the different GTP header indication, the gNB may use different DRBs. Generally, on the basis of the ability for 5GS to assign multiple 5QIs within the same QoS flow, the gNB may use the as indicator to map different image part data sets (or respective traffic) within the QoS Flow to different DRBs. Further, viewport identifications may be used for further differentiating different image part data sets (or respective traffic) within the QoS Flow using GTP-U headers so that the RAN can map to appropriate DRBs. These and further aspects are set forth in greater detail in the following.

As above, viewport identifications are associated to the different viewports and the image part data sets (or the respective traffic) together the viewport identifications are provided to an entity that maps, on the basis of the viewport identifications, the image part data sets respectively to radio data bearers supporting a QoS suitable for the respective image part data sets and viewport, respectively.

However, according to FIG. 8 image part data sets (or the respective traffic) are forwards via a common QoS flow, in which the different image part data sets (or the respective traffic) are marked by the respective viewport identification.

This can be accomplished differentiating the different image part data sets by using GTP-U header including the respective viewport identification.

On the basis of the viewport identifications, respective image quality indicators can be assigned to the different image part data sets, wherein an image quality indicator may indicate in which quality the image represented by an image part data set is to be displayed. In 5GS, may be used as image quality indicators.

On the basis of the image quality indicators, the image part data sets may be mapped to DRBs supporting the QoS required for the respective image part data sets. In 5GS, this can be accomplished by an gNB in downlink direction and by a UE in uplink direction.

FIG. 8 procedures may be used in download and/or upload direction. For example, for download direction GTP-U header may be used for differentiation, while for upload direction BSR may be employed.

In a further procedure, the user side may be involved in that the user side provides viewport identifications the network. Particularly, a user equipment may determine the viewports currently necessary to present a user the image(s) the users wishes/expects to see.

As already explained above, the different viewports are associated with viewport identifiers. The user equipment sends the viewport identifiers to the network together with requests to the network to provide VR image data. In 3GPP, this can be made as part of L2 signaling (e.g. enhanced buffer status report eBSR or packet data convergence protocol PDCP PDU).

On the basis of the received viewport identifiers, the network may differentiate the VR image data requests from the user equipment according to the requested image quality. Then, depending on the requested quality (and, thus, depending from the viewport identifiers) the VR image data may be provided via one or more communication links supporting the respective requested image quality.

In 5GS, this may be accomplished as follows. A SMF provides several 5QIs to a gNB for one or more QoS flows (which may be targeted for VR streams). Depending from the viewport identifiers and the requested image quality, the gNB assigns the image part data sets that are to be provided to meet the VR image data requests from the user equipment to a suitable one of the 5QIs.

In this way, the network (e.g. gNB) can offer different QoSs for, e.g., center FOV images and edge FOV images, or for high- and low-quality tiles.

Such procedures may be used in upload direction.

A further procedure allows a synchronization of QoS for downlink and uplink. Such procedures may be used in combinations with any of the above described procedures. Particularly, here the network and the user equipment agree that the user equipment adopts the QoS rules of the network for uplink traffic. This allows to differentiate downlink traffic and uplink traffic in the same way.

In 3GPP 5G, such an approach is referred to as Reflective QoS that will be summarized shortly in the following. Reflective QoS may activated by the UPF. Then, the user equipment shall use the derived QoS rules to determine mapping of uplink traffic to QoS Flows. Further, Reflective QoS may by activated by the RAN. Then, the user equipment shall use the derived QoS rules to determine mapping of uplink QoS Flows to appropriate DRB.

Reflective QoS is controlled on per-packet basis by using a Reflective QoS Indication (RQI). The RQI is provided by the UPF in downlink traffic together with a QoS Flow Identifier QFI in the (GTP-u) encapsulation header on N3 and then propagated by the 5G-AN on the interface with the user equipment. In reflective QoS, user equipment derives uplink mapping rule(s) based on received downlink traffic; 5G user equipment applies reflective QoS on two levels; "NAS" and "AS"-levels.

For VR service, the following procedures can be used. The network establishes rules according to the user equipment adopts the QoS rules of the network for only uplink traffic associated with viewports for which the network provides image data. In other words, such rules define that the agreement that the user equipment adopts the QoS rules of the network applies only to traffic for a viewport.

In 5GS, this may be accomplished by the PCF in that the PCF provides, for PDU Session and QoS flows serving VR traffic, policies regarding viewport information and Reflective QoS such that the SMF Install N4 rules in the UPF ensuring that the UPF activates RQI only for traffic within the viewport. This will then ensure that the AN also activates Reflective QoS.

It the user equipment supports an agreement to adopt the QoS rules of the network, the user equipment may indicate this capability to the network, e.g., upon session establishment or modification. In 5GS, the user equipment may inform the network that it supports Reflective QoS during PDU session establishment or modification.

Having received this information, the network may include into downlink traffic information indicating towards the user equipment that this downlink traffic is to be handled under the agreement that the user equipment adopts the QoS rules of the network. Having received this information, the user equipment applies the QoS used for downlink traffic also for its uplink traffic associated to the downlink traffic. The latter may be the case if downlink and uplink traffic belong to the same QoS flow(s).

In 5GS, this may be carried out as follows. When the UPF receives from SMF an indication to use Reflective QoS for a certain QoS flow, so UPF will include in the encapsulation header of the packets sent to gNB via N3 interface a new field named RQI (Reflective QoS Indicator). When the gNB receives the RQI and QFI from UPF, this is indicated towards the UE (that has already signaled its support of Reflective QoS, see above). Then, the UE monitors the above header and, if RQI is set, applies the QoS used for downlink traffic to its uplink transmission. with no specific signaling to tell the UE which QoS will be used in UL.

Here, since the network defines that the agreement that the user equipment adopts the QoS rules of the network applies to VR image related downlink traffic only, only associated uplink traffic will use the same QoS as the downlink traffic. The derived QoS may be used by the user equipment to determine mapping of uplink QoS flows to appropriate DRB. This allows to differentiate viewport and associated image in the same way for both uplink and downlink.

In other word, viewport information is used to establish an agreement that the user equipment adopts the QoS rules of the network. In 5GS, viewport information is used for activating Reflective QoS and determining RQI on a per packet basis.

Figure 9:
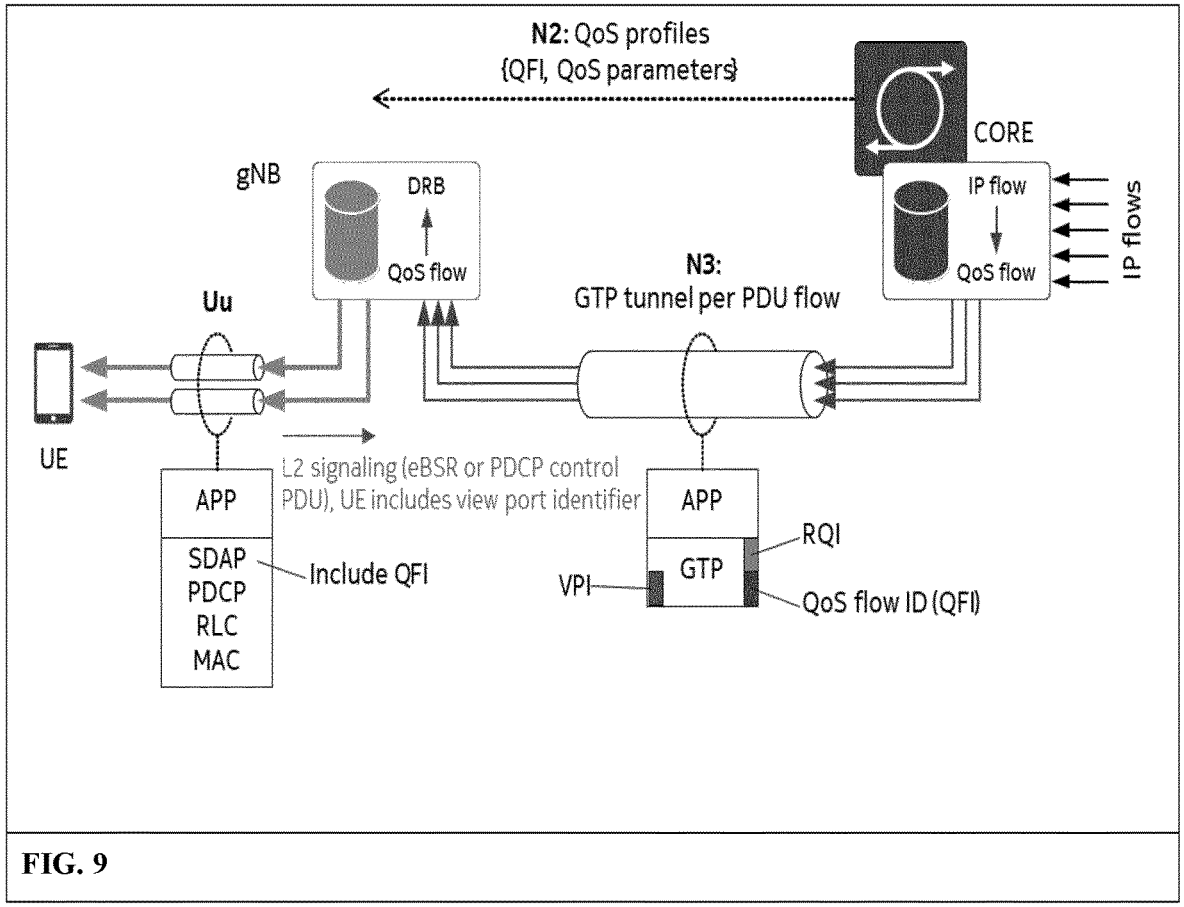
FIG. 9 is an exemplary illustration of a Quality of Service QoS framework in line with the present disclosure.

FIG. 9 illustrates possible modifications, which support implementing teachings of the present disclosure, of the QoS framework in a communication network, e.g. 5GS.

For cases where user equipment indicates, in a VR service request to the network, which viewport is concerned, the user equipment may include (as set forth above) respective viewport identification(s) into the uplink request(s). In 5GS, this may be accomplished by providing viewport identification(s) (in FIG. 9, short VPI) as part of enhanced buffer status report eBSR or packet data convergence protocol PDCP control PDU(s).

For cases where the DRBs are selected on the basis of viewport identification(s), the network may map VR image traffic (particularly respective image part data sets) to DRBs. In 5GS, this may be accomplished by the RAN mapping PDUs from NG3 tunnel to DRBs based on the viewport identification(s) and, also, possibly based on QoS Flow Identifier QFI.

Further, the network may implement rules with respect to marking, detection and handling of VR traffic. In 5GS, this may be accomplished by the PCF providing viewport identifications (VPI) as part of PCC rules to SMF, for downlink or uplink or both. In line therewith, the SMF may provide viewport identification (VPI) as part of N4 rules.

In cases where the QoS flows are selected on the basis of viewport identification(s), the network may map VR traffic towards the user side to QoS flows based on viewport identification(s) provided within the network. In 5GS, this may be accomplished by the UPF mapping User Plane traffic to QoS flows based on the viewport identification(s). To this end, SDF templates within PDR may be also used.

In cases where VR traffic is marked as such, the network may provide VR traffic (and particularly respective image part data sets) together with the respective viewport identification. In 5GS, this may be accomplished by the UPF transmitting VR data packets in a single tunnel between 5GC and RAN, wherein the UPF may include the viewport identification(s) in the encapsulation header, which may also include the QFI.

Figure 10:
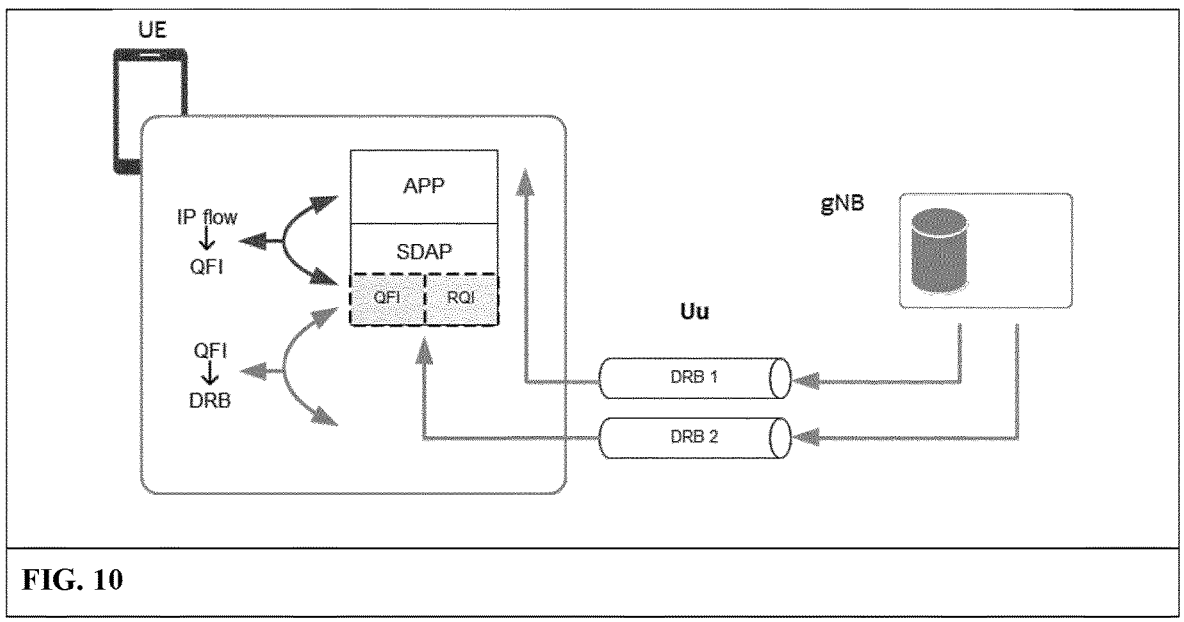
FIG. 10 is an exemplary illustration of a Quality of Service QoS framework in line with the present disclosure.

FIG. 10 illustrates further possible modifications, which support implementing teachings of the present disclosure, regarding an agreement that the user equipment adopts the QoS rules of the network. The following observations are made with reference to, as illustrative example, 5GS, but correspondingly to other communication network types as well.

In reflective QoS, user equipment UE derives uplink mapping rule(s) based on received downlink traffic. The user equipment UE applies reflective QoS on two levels; "NAS" and "AS"-levels. As regards the teachings of the present disclosure, the following modifications may be carried out.

SMF installs N4 rules in the UPF so that it activates Reflective QoS on the downlink on a per packet by setting RQI based on viewport identifications and, possibly, also PDR. UPF sets the RQI based on PDR and viewport information for QoS Flows with VR traffic When RQI bit of the SDAP header is set, UE may associate the QFI with the downlink application flow and derives a corresponding uplink IP flow to QFI mapping rule.

Further, when RQI bit of the SDAP header is set, UE may associate the QFI with DRB ID and derives corresponding uplink QFI to DRB mapping rule.

The subject matter described herein may be embodied in systems, apparatus, methods, and/or articles depending on the desired configuration. For example, the user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and sub-combinations of the disclosed features and/or combinations and sub-combinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least". The use of the phase "such as" means "such as for example" unless otherwise indicated.

What is claimed is:

1. An apparatus, comprising:
   at least one processor; and
   at least one memory including computer program code;
   the at least one memory and the computer code are configured to, with the at least one processor, cause the apparatus at least to:
   determine at least two viewports for a user, each of the at least two user viewports corresponding to a portion of a Virtual Reality (VR) image to be provided to the user, wherein the VR image is represented by image data, and wherein the image data comprises at least two image part data, each of the at least two image part data being associated with a respective part of the VR image;
   associate a viewport identification with each of the at least two user viewports;

determine, for each of the at least two user viewports, image part data including an image portion of the VR image to be provided to or received from the user;

associate the viewport identifications respectively to the image part data determined for the user viewport; and agree, between a network node and a user equipment of the user, that rules with respect to quality of service for each of the at least two user viewports are applied to an uplink communication from the user equipment to the network node for each corresponding viewport of the at least two user viewports.

2. The apparatus according to claim 1, wherein the at least one memory and the computer code are further configured to, with the at least one processor, cause the apparatus at least to:

create a packet detection rule based on the viewport identification for detecting traffic of a portion of the VR image associated with the viewport identification.

3. The apparatus according to claim 1, wherein the at least one memory and the computer code are further configured to, with the at least one processor, cause the apparatus at least to:

provide, from the network node to the user equipment, the image part data to the user according to the corresponding associated viewport identification.

4. The apparatus according to claim 1, wherein the at least one memory and the computer code are further configured to, with the at least one processor, cause the apparatus at least to:

provide, from the network node to the user equipment, the image part data to the user by creating a separate data flow for each of the at least two image part data, wherein each of the separate data flows supports a quality of service corresponding to the viewport identification associated with respective image part data.

5. The apparatus according to claim 1, wherein the at least one memory and the computer code are further configured to, with the at least one processor, cause the apparatus at least to:

provide, from the network node to the user equipment, the image part data to the user by creating a common data flow supporting a common quality of service, wherein the common quality of service supports an image quality at least corresponding to a best image quality of one of the viewport identifications, and the image part data is provided in association with respective viewport identification.

6. The apparatus according to claim 1, wherein the at least one memory and the computer code are further configured to, with the at least one processor, cause the apparatus at least to:

provide, from the network node to the user equipment, the image part data to the user by defining at least two data flows, each of the two data flows having a quality of service, and mapping the image part data to one of the at least two data flows based on the viewpoint identification.

7. The apparatus according to claim 1, wherein the at least one memory and the computer code are further configured to, with the at least one processor, cause the apparatus at least to:

provide, from the network node to the user equipment, the image part data to the user by defining a common data flow for the image data, wherein the common data flow is associated with multiple 5G quality of service (QOS) identifiers associated with the respective viewport identification, and mapping the image part data to different data radio bearers (DRBs) based on respective 5G QoS identifier and the viewpoint identification.

8. The apparatus according to claim 1, wherein the at least one memory and the computer code are further configured to, with the at least one processor, cause the apparatus at least to:

map each data flow to a data radio bearer supporting a quality of service of respective data flow and the viewport identification.

9. The apparatus according to claim 1, wherein the at least one memory and the computer code are further configured to, with the at least one processor, cause the apparatus at least to:

mark a packet of each data flow with the viewport identification in a GPRS Tunneling Protocol (GTP) header based on a packet detecting rule.

10. The apparatus according to claim 1, wherein the at least one memory and the computer code are further configured to, with the at least one processor, cause the apparatus at least to:

include the viewport identification in a Medium Access Control (MAC) control element.

11. The apparatus according to claim 10, wherein the at least one memory and the computer code are further configured to, with the at least one processor, cause the apparatus at least to:

include the viewport identification in an enhanced buffer status report (eBSR) or packet data convergence protocol (PDCP) control packet unit by the user equipment.

12. The apparatus according to claim 1, wherein the at least one memory and the computer code are further configured to, with the at least one processor, cause the apparatus at least to:

provide, from the network node to the user equipment, the image part data by associating an image quality indicator to the image part data, and transmitting the image part data together with a respective image quality indicator via a common data flow supporting a common quality of service.

13. The apparatus according to claim 12, wherein the at least one memory and the computer code are further configured to, with the at least one processor, cause the apparatus at least to:

map the image part data to a data radio bearer supporting a quality of service of the respective image quality indicator.

14. The apparatus according to claim 1, wherein the at least one memory and the computer code are further configured to, with the at least one processor, cause the apparatus at least to:

provide, from the network node to the user equipment, the image part data by transmitting the viewport identifications from the user equipment to the network node, wherein the apparatus is caused to determine, for each of the at least two user viewports, the image part data including image data of the image portion to be provided to the user, based on the viewport identifications received from the user.

15. The apparatus according to claim 1, wherein the apparatus comprises the network node or the user equipment.

16. The apparatus according to claim 1, wherein the apparatus comprises the network node comprising at least one of a user plane function (UPF), a session management function (SMF), an application function (AF), a policy control function (PCF), or a base station.

17. A user equipment, comprising:
at least one processor; and
at least one memory including computer program code;
the at least one memory and the computer code are configured to, with the at least one processor, cause the user equipment at least to:
determine at least two viewports for a user, each of the at least two user viewports corresponding to a portion of a Virtual Reality (VR) image to be provided to the user, wherein the VR image is represented by image data, and wherein the image data comprises at least two image part data, each of the at least two image part data being associated with a respective part of the VR image;
associate a viewport identification with each of the at least two user viewports;
agree, between a network node and the user equipment of the user, that rules with respect to quality of service for each of the at least two user viewports are applied to an uplink communication from the user equipment to the network node for each corresponding viewport of the at least two user viewports; and
transmit the associated viewport identifications to the network node.

18. A method of operating a user equipment, comprising:
determining at least two viewports for a user, each of the at least two user viewports corresponds to a portion of a Virtual Reality (VR) image to be provided to the user, wherein the VR image is represented by image data, and wherein the image data comprises at least two image part data, each of the at least two image part data being associated with a respective part of the VR image;
associating a viewport identification with each of the at least two user viewports;
agreeing, between a network node and a user equipment of the user, that rules with respect to quality of service for each of the at least two user viewports are applied to uplink communication from the user equipment to the network node for each corresponding viewport of the at least two user viewports; and
transmitting the associated viewport identifications to the network node.

* * * * *